United States Patent [19]

Free et al.

[11] 4,290,485

[45] Sep. 22, 1981

[54] REDUCTION OF WATER PRODUCTION FROM HYDROCARBON CONTAINING SUBSURFACE FORMATIONS

[75] Inventors: Dustin L. Free, Tulsa; Howard M. Phillips, Oklahoma City, both of Okla.

[73] Assignee: The Dow Chemical Company, Midland, Mich.

[21] Appl. No.: 251,345

[22] Filed: May 8, 1972

[51] Int. Cl.³ .................. E21B 33/138; E21B 43/27
[52] U.S. Cl. ........................... 166/281; 166/295; 166/307
[58] Field of Search ............ 166/295, 270, 300, 294, 166/271, 307, 281

[56] References Cited

U.S. PATENT DOCUMENTS

| | | | |
|---|---|---|---|
| 3,087,543 | 4/1963 | Arendt | 166/295 |
| 3,306,870 | 2/1967 | Eilers et al. | 166/295 X |
| 3,308,885 | 3/1967 | Sandiford | 166/295 |
| 3,421,584 | 1/1969 | Eilers et al. | 166/295 |
| 3,500,929 | 3/1970 | Eilers et al. | 166/295 |
| 3,603,397 | 9/1971 | Peray | 166/295 |
| 3,613,790 | 10/1971 | Stout et al. | 166/295 X |
| 3,687,200 | 8/1972 | Routson | 166/295 X |
| 3,757,863 | 9/1973 | Clampitt et al. | 166/270 X |
| 3,762,476 | 10/1973 | Gall | 166/294 |
| 3,949,811 | 4/1976 | Threlkeld et al. | 166/294 |
| 4,120,361 | 10/1978 | Threlkeld et al. | 166/295 |

*Primary Examiner*—Stephen J. Novosad
*Attorney, Agent, or Firm*—D. H. Fifield

[57] ABSTRACT

To reduce the production of water from a subsurface hydrocarbon-bearing interval of a formation the producing interval of the formation is treated with an aqueous solution or sol of a high molecular weight, water soluble polyacrylamide (PAM). The polymer which is absorbed in the formation is crosslinked in situ, e.g. by subsequently flushing the formation with a crosslinking solution.

16 Claims, No Drawings

REDUCTION OF WATER PRODUCTION FROM HYDROCARBON CONTAINING SUBSURFACE FORMATIONS

BACKGROUND OF THE INVENTION

The use of polyacrylamide solutions to treat hydrocarbon-bearing formations to reduce the water produced therefrom is well known. Arendt, U.S. Pat. No. 3,087,543, teaches to treat the entire production interval with an acrylamide carboxylic acid copolymer. Sandiford, U.S. Pat. No. 3,308,885, teaches to perform similar treatments employing a polyacrylamide solution wherein the polymer is from about 8 to about 70 percent hydrolyzed.

A method has now been discovered for improving the effectiveness of such treatments. The improvements consist in decreasing the water/oil ratio and increasing the time over which the treatment is effective.

SUMMARY OF THE INVENTION

The present invention concerns an improved method for decreasing the water/oil ratio from a hydrocarbon producing subsurface formation.

The invention comprises injecting into the producing interval of a formation, through a producing well, a substantial quantity of an aqueous solution, or sol, of a high molecular weight, water soluble hydrolyzed polyacrylamide. Prior to or following the injection of the polymer solution a second aqueous solution containing a crosslinker for the polymer is injected into the formation to crosslink the polymer. The well is then placed back on production.

DETAILED DESCRIPTION OF THE INVENTION

The polymer solution preferably contains from about 0.01 to 0.75 percent by weight of the polymer.

It is preferred to treat the entire water zone of the formation around the given producing well being treated.

The polymer useful in the invention comprises a partially hydrolyzed uncrosslinked or only slightly crosslinked water-soluble polyacrylamide which is obtained by the polymerization, preferably homopolymerization, of acrylamide. If desired, however, up to about 10 weight percent of other vinyl monomers such as vinyl acetate, acrylonitrile, methacrylonitrile, vinyl alkyl ethers, vinyl chloride and the like, can be employed provided that the copolymers so obtained are characterized by water solubility and freedom from crosslinking. The acrylamide is polymerized by any suitable vinyl polymerization initiator, e.g., free radical forming compounds such as the azo compounds, e.g., azobisisobutyranitrile, azobisisobutyramidine chloride, etc., peroxides such as hydrogen peroxide, sodium peroxide, benzoyl peroxide; alkyl peroxides such as t-butyl hydrogen peroxides; and dialkyl peroxides such as diethyl peroxide, di-t-butyl peroxide, etc; alkali metal persulfates, etc. These polymers are characterized by high molecular weight, e.g., 500,000 to about 15,000,000; preferably from 1,000,000 to about 5,000,000 and for use in the invention are partially hydrolyzed so that from about 0.1 to about 70 percent of the amide groups of the polymer are hydrolyzed to carboxylic acid or carboxylate groups. While the hydrolysis can be performed in a step separate from the polymerization of the monomer, it is preferred to employ a simultaneous polymerizaton and hydrolysis step.

Preferably, following the injection of the polymer solution an aqueous solution is injected into the formation to flush substantially all the polymer solution from the well bore and into the formation.

The polymer is absorbed within the formation. It is known that the mere presence of the polymer will preferentially decrease the flow of water through the formation. However, it has been found that a greater reduction in produced water can be achieved if the polymer is crosslinked after it is placed into the formation. Preferably the polymer is crosslinked by contacting the absorbed polymer with an aqueous solution containing dissolved therein a water soluble crosslinking agent. Preferred crosslinking agents are water soluble salts of di- and trivalent metals and certain known organic crosslinking compounds. Suitable metal cations include, for example, copper, magnesium, ferric and ferrous, calcium, aluminum, chromium, neodymium, zinc, cobalt, cadmium, nickel, ytterbium, lead, beryllium, $VO+2$, $VO_2+2$ and the like. Suitable salts include water soluble nitrates, halides, sulfates and the like. Alternatively the formation can be contacted with the crosslinking solution prior to injecting the polymer. Depending on the formation and the type of polymer employed the crosslinking solution can be immediately pumped into the formation or it can be pumped in after a delay of a few hours or days.

Sufficient polymer and crosslinking solution is used to treat a desired radial distance into the formation around the borehole. Only a few feet or hundreds of feet radially from the borehole of the formation can be treated in the manner described hereinbefore.

Depending upon the type of crosslinker employed and the formation composition the well is preferably shut-in for a period of time sufficient for the polymer to cross-link. Shut-in times of from about 0.5 to 5 days are generally suitable.

In many instances an improvement in the process is achieved by first acidizing the formation to be treated according to the practice of the present invention. Acidizing of the formation will increase the selective permeability thereof to the polymer solution thus allowing a greater portion of the water bearing formation to be treated. Any acidizing compositions well known in the art can be employed. These acids include, for example, HCl, HF, various organic acids, mixtures thereof and the like.

In carrying out the process of the invention conventional injection procedures are employed. If required the well to be treated is fitted with packers, and the aqueous treating solutions are forced down the well bore and out into the reservoir formation by means of conventional pumping equipment located at the well head.

EXAMPLE I

Several core plugs taken from a subsurface formation which was producing water and oil were treated in the following manner. Two core plugs (No. 1 and 2 in Table I) were saturated with 3 percent by weight of an aqueous solution of $CaCl_2$ and the permeability to the solution was determined. The core plugs were then flushed with a sodium chloride solution containing 1000 or 2000 ppm (parts per million) of polyacrylamide (20-25 percent hydrolyzed and having a molecular weight ranging from about 4 to 6 million). The cores were then flushed with the calcium chloride solution to determine the effect of the polymer on the permeability of the core. A third core (No. 3) was flushed with the calcium chloride solution followed by the same polymer solution as core No. 1 and again flushed with the calcium chloride solution. Following the second flushing with the calcium chloride solution the core was flushed with an aqueous solution containing about 1000 ppm of polyacrylamide less than 1 percent hydrolyzed and having a molecular weight of between about 1.5 to about 2.5 million. The permeability of the core to the calcium chloride solution was then determined.

The permeability of a fourth core (No. 4) to a 3 percent by weight calcium chloride solution was determined in the same manner described hereinbefore. Following this 30 mls of 1000 ppm aqueous solution of polyacrylamide (20–25 percent hydrolyzed—molecular weight of 4 to 6 million) was flushed through the core. Following this 10 mls of a 1 percent by weight aqueous solution of aluminum sulfate (crosslinker) was flushed through the core. An attempt to flush the so treated core with calcium chloride solution under 125 psi pressure failed showing the core to be completely plugged.

The results of these tests are set forth in the following Table I.

crosslinking of the polymer, was introduced through the well bore and in contact with the formation treated with the polymer solution. The well was then treated with 450 barrels of salt water containing 1100 pounds of aluminum sulfate crosslinker. The well was again flushed with 172 barrels of load oil. When the well was returned to production, the oil production had increased to 31 BOPD and the water production was 275 BWPD.

EXAMPLE 3

The following treatment was performed on a producing well which, before the treatment produced about 10 barrels per day of oil (BO) and about 330 barrels per day of water (BW). The well was first flushed with 21 barrels (bbls) of hydrochloric acid to insure adequate injectivity. The acid was displaced from the well with 56 bbls of brine produced from the well. Then 3500 barrels of an aqueous solution containing about 1400 pounds of polyacrylamide (MW 2 million, about 1% hydrolyzed) was injected into the producing formation. This was followed by about 150 bbls of produced brine to flush the borehole. Then 450 bbls of the brine containing 450 pounds of aluminum sulfate crosslinker was introduced through the well bore and in contact with the produc-

TABLE I

| Core No. | Fluid Flush | Differential Pressure, psi | Vol. of Fluid ml. | Time Seconds | Permeability Millidarcy | Percent Reduction in Permeability |
|---|---|---|---|---|---|---|
| 1 | CaCl$_2$ | 20 | 10 | 30 | 116 | — |
|   | Polymer Solution | — | 30 | — | — | — |
|   | CaCl$_2$ | 18 | 10 | 106 | 35 | 70 |
| 2 | CaCl$_2$ | 20 | 10 | 14.7 | 232 | — |
|   | Polymer solution | — | 30 | — | — | — |
|   | CaCl$_2$ | 20 | 10 | 48 | 71 | 69 |
| 3 | CaCl$_2$ | 20 | 10 | 12.4 | 273 | — |
|   | First Polymer Solution | — | 30 | — | — | — |
|   | CaCl$_2$ | 20 | 10 | 32 | 104 | 62 |
|   | Second Polymer Solution | — | 30 | — | — | — |
|   | CaCl$_2$ | 18 | 10 | 30 | 123 | 55 |
| 4 | CaCl$_2$ | 21 | 10 | 44 | 76.7 | — |
|   | Polymer Solution | — | 30 | — | — | — |
|   | Al$_2$(SO$_4$)$_3$ | — | 10 | — | — | — |
|   | CaCl$_2$ | 125 | No permeability core plugged | | | |

EXAMPLE II

As a result of the laboratory studies made in Example I the following treatment was performed on a producing well in the formation from which the cores were taken. The well produced about 5 barrels of oil per day (BO) and about 560 barrels of water per day (BW) before the treatment. The well was first treated with 12 barrels of hydrochloric acid (containing an iron chelating agent) to insure proper injectivity. The acid was displaced from the well with 101 barrels of produced brine. Then 3990 barrels of an aqueous solution containing 1500 pounds of polyacrylamide (MW of about 4-6 million, 20–25% hydrolyzed) was injected into the formation. The bore hole was then flushed with 300 barrels of produced brine. This was then followed by 150 barrels of load oil containing a corrosion inhibitor and surfactant. Nine days after the well was returned to production, the well produced 2 BO and 200 BW, i.e. showing little improvement in the water/oil ratio. In an attempt to improve the water/oil ratio, 45 days after the initial PAM treatment was performed 100 barrels of produced brine with its pH adjusted to about 3 with HCl, to prevent premature acid spending and premature ing formation previously treated with the polymer solution. The well was then treated with an aqueous solution containing various corrosion inhibitors and bactericides. When the well was returned to production the oil production increased to 44 BO and the water production dropped to 300 BW. Six other oil producing wells were treated in the manner described hereinbefore. In each instance the water to oil ratio following the treatment was decreased.

When employing crosslinking agents which are precipitated from solution when the pH is changed it is preferred to flush the formation after the injection of the polymer with an aqueous solution having a pH which is not harmful to the crosslinking solution. For example, the polymer is injected into the formation in an aqueous solution having a pH of about 8. The crosslinking solution of aluminum sulfate has a pH of about 3. If the pH of the crosslinking solution is raised to about 6 aluminum hydroxide will precipitate thus being rendered inactive for crosslinking the polymer. The pH of the crosslinking solution could be lowered sufficiently by the higher pH water in the formation to precipitate out the crosslinker. Therefore, prior to the introduction of the crosslinking solution the formation is flushed with an aqueous solution having its pH adjusted to at least about 3 with, for example, HCl. Then the formation is flushed with the crosslinking solution. By this preferred embodiment a greater quantity of crosslinking agent is injected into the formation before it becomes spent and thus is available for crosslinking the polymer.

What is claimed is:

1. In the method of treating a subsurface oil and water-producing interval of a formation located adjacent to a well bore to decrease the volume ratio of water to oil produced therefrom wherein an aqueous solution of a partially hydrolyzed polyacrylamide, said solution being substantially free of a crosslinking agent for said polyacrylamide, is injected into the producing formation and then producing fluids from said formation, the improvement which comprises: acidizing the interval to be treated prior to the injection of polymer solution to increase the injectivity of the interval; crosslinking the polymer after it is introduced into the formation and prior to producing fluids from the treated formation by contacting said polymer with an aqueous solution containing a water soluble salt of a di or trivalent metal cation or an organic crosslinking agent so that said polymer is crosslinked to a degree sufficient to achieve a greater reduction in the volume ratio of water to oil produced than is obtained with injection of only said substantially uncrosslinked polyacrylamide.

2. The method of claim 1 wherein following the injection of the polymer solution, injecting an aqueous solution in an amount sufficient to flush said well bore of polymer solution prior to crosslinking said polymer.

3. The method of claim 1 wherein an aqueous solution containing polyvalent crosslinking metal cations dissolved therein is injected into the polymer treated formation to crosslink said polymer in said formation.

4. The method of claim 3 wherein the polyvalent metal cation is aluminum.

5. The method of claim 3 wherein the polymer solution contains from 0.01 to about 0.75 percent by weight of polyacrylamide.

6. The method of claim 5 wherein the molecular weight of the polyacrylamide is at least about 500,000 and from about 0.1 to about 70 percent of the amide groups are hydrolyzed to carboxylate groups.

7. The method of claim 1 wherein the polymer solution contains from 0.01 to about 0.75 percent by weight of polyacrylamide.

8. The method of claim 7 wherein the molecular weight of the polyacrylamide is at least about 500,000 and from about 0.1 to about 70 percent of the amide groups are hydrolyzed to carboxylate groups.

9. The method of claim 1, 7 or 8 wherein the crosslinking solution is injected into the interval of the formation prior to the injection of said polymer solution.

10. The method of claim 9 wherein the crosslinking solution contains polyvalent crosslinking metal cations dissolved therein.

11. The method of claim 1, 7 or 8 wherein the crosslinking agent is a water soluble salt of a trivalent metal cation.

12. The method of claim 4, 7 or 8 wherein said polymer is contacted with an aqueous solution of aluminum sulfate.

13. The method of claim 1 wherein the crosslinking agent is organic.

14. In the method of treating a producing interval of a subsurface formation producing both a fluid hydrocarbon and water wherein an aqueous solution of polyacrylamide is injected into the producing interval through a well bore, the improvement which comprises:

(a) selectively acidizing the producing interval to increase the injectivity thereof;
(b) injecting into the producing interval from the borehole an aqueous solution of partially hydrolyzed polyacrylamide;
(c) flushing well bore to remove any polyacrylamide solution therefrom;
(d) injecting into the producing interval treated with the solution of polyacrylamide an aqueous solution of a crosslinking agent;
(e) shutting the producing interval in for a period of time sufficient to crosslink the polymer; and
(f) returning the well to production.

15. The method of claim 14 wherein the crosslinking agent is aluminum sulfate.

16. In the method of treating a subsurface oil and a water-producing interval of a formation located adjacent to a well bore to decrease the volume ratio of water to oil produced therefrom, wherein an aqueous solution of a partially hydrolyzed polyacrylamide, said solution being substantially free of a crosslinking agent for said polyacrylamide, is injected into the producing formation and then producing fluids from said formation, the improvement which comprises:

(a) acidizing the interval to be treated prior to the injection of polymer solution to increase the injectivity of the interval;
(b) providing from about 0.01 to about 0.75 percent by weight of polyacrylamide in said aqueous solution wherein said polyacrylamide has a molecular weight of at least about 500,000 and from about 0.1 to about 70 percent of the amide groups are hydrolyzed to carboxylate groups, and (c) crosslinking the polyacrylamide after it is introduced into the formation and prior to producing fluids from the treated formation by contacting the polyacrylamide with an aqueous solution of aluminum sulfate so that said polymer is crosslinked to a degree sufficient to achieve a greater reduction in the volume ratio of water to oil produced than is obtained with injection of only said substantially uncrosslinked polyacrylamide.

* * * * *